US010488075B2

(12) United States Patent
Burd

(10) Patent No.: US 10,488,075 B2
(45) Date of Patent: Nov. 26, 2019

(54) APPARATUS FOR PRE-HEATING POTABLE WATER IN AIRCRAFT WITH WASTE HEAT

(71) Applicant: B/E AEROSPACE, INC., Wellington, FL (US)

(72) Inventor: Peter John Leslie Burd, Carmarthenshire (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 995 days.

(21) Appl. No.: 14/301,547

(22) Filed: Jun. 11, 2014

(65) Prior Publication Data

US 2014/0367070 A1 Dec. 18, 2014

Related U.S. Application Data

(60) Provisional application No. 61/836,400, filed on Jun. 18, 2013.

(51) Int. Cl.
 F24H 1/00 (2006.01)
 B64D 11/04 (2006.01)
 (Continued)

(52) U.S. Cl.
 CPC ........... F24H 1/00 (2013.01); B64D 11/0007 (2013.01); B64D 11/02 (2013.01); B64D 11/04 (2013.01);
 (Continued)

(58) Field of Classification Search
 CPC ......... F24H 1/00; F24H 1/009; B64D 11/007; B64D 11/02; B64D 11/04; B64D 13/06; B64D 2013/0629; Y02T 50/56
 (Continued)

(56) References Cited

U.S. PATENT DOCUMENTS 4,462,542 A * 7/1984 Person ...................... F24D 5/00
 126/502
6,283,067 B1 * 9/2001 Akkala .................. F24D 12/02
 122/14.22
(Continued)

FOREIGN PATENT DOCUMENTS

CN 1902087 A 1/2007
CN 1902454 A 1/2007
(Continued)

OTHER PUBLICATIONS

International Search Report, dated Sep. 15, 2014, 4 pages, from PCT/US2014/42337.
(Continued)

*Primary Examiner* — Keith M Raymond
*Assistant Examiner* — Raheena R Malik
(74) *Attorney, Agent, or Firm* — Suiter Swantz pc llo

(57) ABSTRACT

An apparatus for pre-heating potable water in aircraft with waste heat includes an air to water heat exchanger having a heat exchanger housing with an inlet end that receives heat from one or more of a galley insert exhaust air inlet, a galley appliance exhaust air inlet and an air chiller exhaust air inlet. A potable water supply inlet supplies potable water to the air to water heat exchanger, which transfers heat to the potable water, and a potable water supply outlet supplies heated potable water, such as to a galley insert or galley appliance, for example. An exhaust air outlet vents cooled exhaust air from the air to water heat exchanger.

11 Claims, 1 Drawing Sheet

(51) Int. Cl.
*B64D 11/02* (2006.01)
*B64D 13/06* (2006.01)
*B64D 11/00* (2006.01)

(52) U.S. Cl.
CPC ............. *B64D 13/06* (2013.01); *F24H 1/009* (2013.01); *B64D 2013/0629* (2013.01); *Y02T 50/56* (2013.01)

(58) Field of Classification Search
USPC ........................................................ 165/164
See application file for complete search history.

(56) References Cited

U.S. PATENT DOCUMENTS

| | | | | |
|---|---|---|---|---|
| 6,332,580 | B1* | 12/2001 | Enander | B60H 1/00364 237/12.3 B |
| 6,354,511 | B1* | 3/2002 | Hardee | F24H 1/08 126/205 |
| 6,543,526 | B2 | 4/2003 | Jacobs | |
| 6,612,504 | B2* | 9/2003 | Sendzik | B63J 2/14 165/41 |
| 6,883,467 | B2* | 4/2005 | Holden | B63J 2/14 122/3 |
| 7,036,746 | B2* | 5/2006 | Murgu | B60H 1/2209 165/41 |
| 7,231,778 | B2 | 6/2007 | Rigney et al. | |
| 7,925,143 | B1* | 4/2011 | Lapwood | F24C 13/00 392/307 |
| 8,720,217 | B2 | 5/2014 | Reed et al. | |
| 9,114,877 | B2 | 8/2015 | Weber et al. | |
| 2002/0189798 | A1* | 12/2002 | Jacobs | F24C 15/2035 165/145 |
| 2008/0087039 | A1 | 4/2008 | Reed et al. | |
| 2012/0048509 | A1 | 3/2012 | Weber et al. | |

FOREIGN PATENT DOCUMENTS

| | | |
|---|---|---|
| DE | 10361686 B4 | 4/2008 |
| DE | 10361645 B4 | 6/2008 |
| DE | 10361653 B4 | 8/2008 |
| EP | 1099910 A2 | 5/2001 |
| JP | 2007516889 A | 6/2007 |
| JP | 2007537077 A | 12/2007 |
| WO | 2008008324 A2 | 1/2008 |

OTHER PUBLICATIONS

International Preliminary Report on Patentability dated Dec. 22, 2015 for PCT/US2014/042337.

* cited by examiner

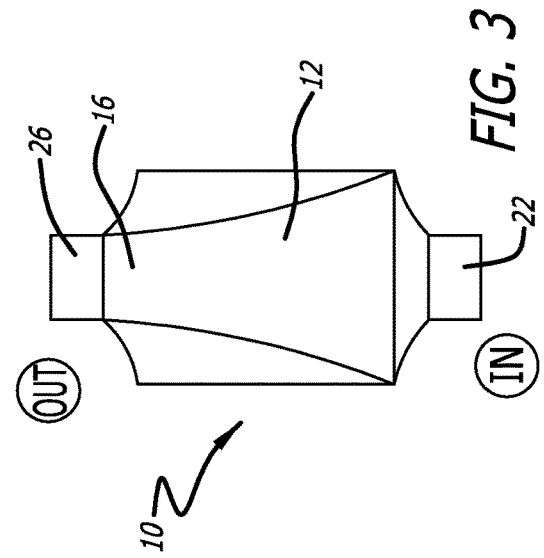
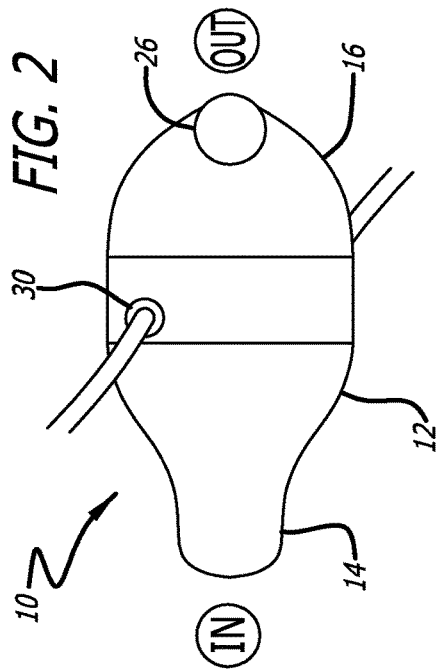
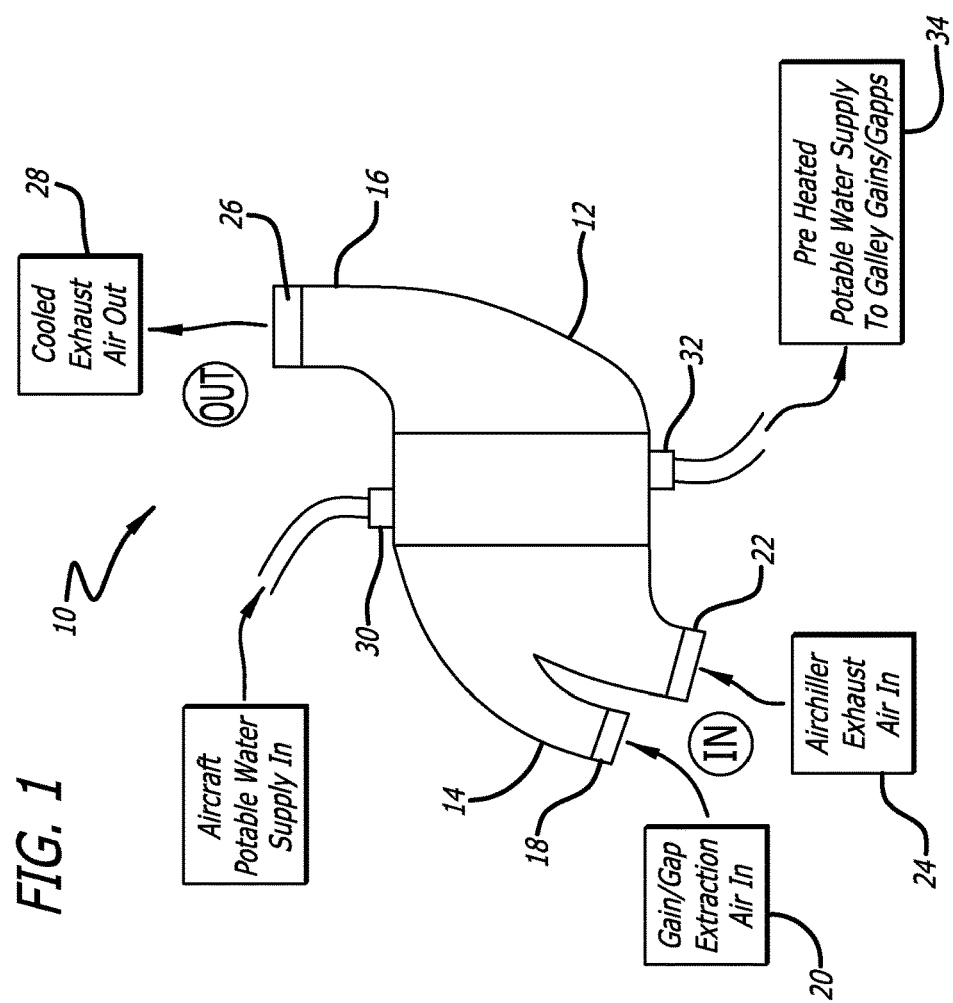

APPARATUS FOR PRE-HEATING POTABLE WATER IN AIRCRAFT WITH WASTE HEAT

CROSS-REFERENCES TO RELATED APPLICATIONS

This application is based upon and claims priority from U.S. Provisional Application No. 61/836,400, filed Jun. 18, 2013, incorporated by reference in its entirety.

This invention relates generally to potable water systems for aircraft, and more particularly relates to an apparatus for pre-heating potable water in aircraft with waste heat from galley insert or galley appliance exhaust air and air chiller exhaust.

BACKGROUND

Commercial aircraft with in-flight catering services commonly have one or more galleys installed on the aircraft that have a supply of potable water supplied under pressure, as well as water drainage for waste water. The potable water may be used for making beverages, such as for tea and coffee, for example, and for cooking, such as in steam ovens, rice boilers, and the like.

It has previously been common practice to rely solely upon conventional galley insert or galley appliance water heating systems that typically draw electrical power from the aircraft to heat such potable water in a galley insert or galley appliance for making beverages or cooking. It also has previously been common practice to rely solely upon conventional aircraft cooling systems to cool air chiller exhaust air and galley insert or galley appliance exhaust air before such exhaust air is vented into the environmental control system of the aircraft or temperature sensitive areas of the aircraft.

It would be desirable to provide an air to water heat exchanger that reduces aircraft power consumption by using waste heat produced by one or more air chillers and galley inserts or galley appliances, such as a refrigerator, oven, water boiler, electronics, and the like, to raise the temperature of potable water supplied for use in the aircraft. It would also be desirable to provide an air to water heat exchanger that cools exhaust air from one or more air chillers and galley inserts or galley appliances, to benefit an aircraft environmental control system or temperature sensitive areas where such exhaust air may be vented. It would also be desirable to provide such an air to water heat exchanger that optionally can be implemented as fixture in the potable water supply system, and to supplement conventional galley insert or galley appliance water heating systems, that is independent of a galley faucet drinking water supply, and that can be filtered independently of a galley faucet drinking water supply. The present invention meets these and other needs.

SUMMARY OF THE INVENTION

Briefly, and in general terms, the present invention provides for an air to water heat exchanger that utilizes waste heat from exhaust air of one or more air chillers and/or galley inserts or galley appliances, and that cools the exhaust air before the exhaust air is vented into an aircraft environmental control system or temperature sensitive areas.

Accordingly, the present invention provides for an apparatus for pre-heating potable water in aircraft with waste heat. The apparatus includes an air to water heat exchanger having a heat exchanger housing including an inlet end and an outlet end. The inlet end of the heat exchanger housing includes one or more of a galley insert exhaust air inlet, a galley appliance exhaust air inlet, and an air chiller exhaust air inlet connected in thermal communication with the air to water heat exchanger and configured to transfer heat from one or more of galley insert exhaust air, galley appliance exhaust air, and air chiller exhaust air to the air to water heat exchanger. The heat exchanger housing outlet end includes an exhaust air outlet connected with the air to water heat exchanger and configured to vent cooled exhaust air from the air to water heat exchanger.

The air to water heat exchanger includes a potable water supply inlet configured to supply potable water to the air to water heat exchanger. The air to water heat exchanger is configured to transfer heat from one or more of heated galley insert or appliance exhaust air and heated chiller exhaust air to potable water from the potable water supply inlet. The air to water heat exchanger includes a potable water supply outlet configured to supply heated potable water from the air to water heat exchanger, such as to a galley insert or galley appliance, for example.

In another presently preferred aspect, the present invention provides for a method for pre-heating potable water in aircraft with waste heat. The method involves providing heated exhaust air from one or more of galley insert exhaust air, galley appliance exhaust air, and air chiller exhaust air to an inlet end of an air to water heat exchanger, and supplying potable water to the air to a potable water supply inlet of the water heat exchanger. Heat is transferred from the one or more of galley insert exhaust air, galley appliance exhaust air, and air chiller exhaust air to the potable water from the potable water supply inlet, cooled exhaust air is vented from an exhaust air outlet of the air to water heat exchanger, and heated potable water is supplied from the air to water heat exchanger, such as to a galley insert or galley appliance, for example.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 1 is a schematic diagram of the air to water heat exchanger according to the present invention.

FIG. 2 is a top plan view of the air to water heat exchanger of FIG. 1.

FIG. 3 is an end elevational view of the air to water heat exchanger of FIG. 1.

DETAILED DESCRIPTION OF THE PREFERRED EMBODIMENTS

Referring to the drawings, which are provided for purposes of illustration and by way of example, the present invention provides for an air to water heat exchanger 10 having a housing 12 with an inlet end 14, and an outlet end 16. The inlet end of the housing preferably includes a galley insert or galley appliance exhaust air inlet 18 for receiving galley insert or galley appliance exhaust air 20, and an air chiller exhaust air inlet 22 for receiving air chiller exhaust air 24. The outlet end of the housing preferably includes a cooled exhaust air outlet 26 for venting cooled exhaust air 28. The galley insert exhaust air inlet or galley appliance exhaust air inlet and the air chiller exhaust air inlet are connected in thermal communication with the air to water heat exchanger, and are configured to transfer heat from one or more of galley insert exhaust air, galley appliance exhaust air, and air chiller exhaust air to the air to water heat exchanger. The heat exchanger housing exhaust air outlet is connected in thermal communication with the air to water heat exchanger, and is configured to vent cooled exhaust air from the air to water heat exchanger.

The air to water heat exchanger also includes a potable water supply inlet 30 and a potable water supply outlet 32 connected in fluid communication with the air to water heat exchanger. The potable water supply inlet is configured to supply potable water to the air to water heat exchanger, and the air to water heat exchanger is configured to transfer heat from one or more of heated galley insert or appliance exhaust air and heated chiller exhaust air to potable water from the potable water supply inlet. The air to water heat exchanger includes a potable water supply outlet configured to provide a preheated potable water supply 34 from the air to water heat exchanger, such as to a galley insert or galley appliance, for example.

The air to water heat exchanger advantageously saves aircraft power by using waste heat produced by an air chiller, or a galley insert or galley appliance, such as a refrigerator, oven, water boiler, electronics, or the like, to raise the temperature of potable water supplied by the aircraft, reducing power consumption. As a consequence, the air to water heat exchanger cools the temperature of the exhaust air from the air chiller, galley insert or galley appliance, to the benefit of the aircraft environmental control system or temperature sensitive areas where the exhaust air from the air chiller, galley insert or galley appliance would be vented. The air to water heat exchanger forms part of the potable water supply system for the galley and can be drained as part of the normal galley supply system purging. The air to water heat exchanger can be an optional fixture, and preferably supplements, rather than replaces, a conventional galley insert or galley appliance water heating capability. The air to water heat exchanger potable water supply is independent of the galley faucet supply, and can be independently filtered.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. An apparatus for pre-heating potable water in aircraft with waste heat, comprising:
    aircraft galley insert or aircraft galley appliance exhaust air;
    air chiller exhaust air;
    an air to water heat exchanger having a heat exchanger housing including an inlet end and an outlet end, said inlet end including an aircraft galley insert or aircraft galley appliance exhaust air inlet and an air chiller exhaust air inlet connected in thermal communication with said air to water heat exchanger, wherein heat is transferred from the aircraft galley insert or aircraft galley appliance exhaust air and the air chiller exhaust air to said air to water heat exchanger, said outlet end including an exhaust air outlet connected in thermal communication with said air to water heat exchanger, wherein cooled exhaust air is vented from said air to water heat exchanger;
    aircraft potable water;
    a potable water supply inlet connected in fluid communication with said air to water heat exchanger, wherein said potable water supply inlet supplies the aircraft potable water to said air to water heat exchanger, wherein said air to water heat exchanger transfers heat from said aircraft galley insert or aircraft galley appliance exhaust air and said air chiller exhaust air to the aircraft potable water from said potable water supply inlet; and
    a potable water supply outlet connected in fluid communication with said air to water heat exchanger, wherein said potable water supply outlet supplies heated aircraft potable water from said air to water heat exchanger.

2. An apparatus for pre-heating potable water in aircraft with waste heat, comprising:
    aircraft galley insert or aircraft galley appliance exhaust air;
    air chiller exhaust air;
    an air to water heat exchanger having a heat exchanger housing including an inlet end and an outlet end, said inlet end including an exhaust air inlet connected in thermal communication with said air to water heat exchanger, wherein heat is transferred from the aircraft galley insert or aircraft galley appliance exhaust air and the air chiller exhaust air to said air to water heat exchanger, said outlet end including an exhaust air outlet connected in thermal communication with said air to water heat exchanger, wherein cooled exhaust air is vented from said air to water heat exchanger;
    aircraft potable water;
    a potable water supply inlet connected in fluid communication with said air to water heat exchanger, wherein said potable water supply inlet supplies the aircraft potable water to said air to water heat exchanger, wherein said air to water heat exchanger transfers heat from said aircraft galley insert or aircraft galley appliance exhaust air and said air chiller exhaust air to the aircraft potable water from said potable water supply inlet; and
    a potable water supply outlet connected in fluid communication with said air to water heat exchanger, said potable water supply outlet being configured to supply heated aircraft potable water from said air to water heat exchanger, the potable water supply outlet connected in fluid communication with an aircraft galley insert or an aircraft galley appliance.

3. The apparatus of claim 2, wherein said exhaust air inlet comprises an aircraft galley insert exhaust air inlet.

4. The apparatus of claim 3, wherein said aircraft galley insert exhaust air inlet is configured to receive heated aircraft galley exhaust air from an aircraft galley insert.

5. The apparatus of claim 4, wherein said air to water heat exchanger is configured to transfer heat from said aircraft galley insert exhaust air to the aircraft potable water from said potable water supply inlet.

6. The apparatus of claim 2, wherein said exhaust air inlet comprises an aircraft galley appliance exhaust air inlet.

7. The apparatus of claim 6, wherein said aircraft galley appliance exhaust air inlet is configured to receive heated aircraft galley exhaust air from an aircraft galley appliance.

8. The apparatus of claim 7, wherein said air to water heat exchanger is configured to transfer heat from said aircraft galley appliance exhaust air to the aircraft potable water from said potable water supply inlet.

9. The apparatus of claim 2, wherein said exhaust air inlet comprises an air chiller exhaust air inlet.

10. The apparatus of claim 9, wherein said air chiller exhaust air inlet is configured to receive heated chiller exhaust air from an air chiller.

11. The apparatus of claim 10, wherein said air to water heat exchanger is configured to transfer heat from said air chiller exhaust air to the aircraft potable water from said potable water supply inlet.

\* \* \* \* \*